US008126159B2

(12) United States Patent
Goose et al.

(10) Patent No.: US 8,126,159 B2
(45) Date of Patent: Feb. 28, 2012

(54) SYSTEM AND METHOD FOR CREATING PERSONALIZED SOUND ZONES

(75) Inventors: Stuart Goose, Albany, CA (US); Farshid Arman, Lafayette, CA (US)

(73) Assignee: Continental Automotive GmbH, Hannover (DE)

( * ) Notice: Subject to any disclaimer, the term of this patent is extended or adjusted under 35 U.S.C. 154(b) by 1446 days.

(21) Appl. No.: 11/404,444

(22) Filed: Apr. 13, 2006

(65) Prior Publication Data

US 2006/0262935 A1 Nov. 23, 2006

Related U.S. Application Data

(60) Provisional application No. 60/681,759, filed on May 17, 2005, provisional application No. 60/712,785, filed on Aug. 30, 2005.

(51) Int. Cl.
*H04B 15/00* (2006.01)

(52) U.S. Cl. ..................... 381/94.1; 381/71.1; 381/71.4; 381/73.1; 381/302; 381/86

(58) Field of Classification Search .................... 381/17, 381/302, 309, 86, 71, 71.1, 94.1, 71.4, 73.1
See application file for complete search history.

(56) References Cited

U.S. PATENT DOCUMENTS 4,107,463 A 8/1978 Pearson
(Continued)

FOREIGN PATENT DOCUMENTS

JP 61-112496 A 5/1986
(Continued)

OTHER PUBLICATIONS

Search Report for PCT/US2006/018658, dated Jan. 25, 2007.

*Primary Examiner* — Vivian Chin
*Assistant Examiner* — Paul Kim

(57) ABSTRACT

Speakers deployed in a space and divided into groups associated with different zones produce a mix of sounds that create internal noise pollution and, combined with external noise, an unpleasant environment for occupants. The present invention contemplates sound systems and methods for creating personalized sound zones to address these and related problems.

18 Claims, 8 Drawing Sheets

Appropriately positioned ultrasonic speakers delivering personalized audio

U.S. PATENT DOCUMENTS

| | | | | |
|---|---|---|---|---|
| 4,932,063 | A | 6/1990 | Nakamura | |
| 4,977,600 | A | 12/1990 | Ziegler | |
| 5,029,218 | A | 7/1991 | Nagayasu | |
| 5,239,578 | A | 8/1993 | Regen et al. | |
| 5,408,532 | A | 4/1995 | Yokota et al. | |
| 5,416,846 | A | 5/1995 | Tamura et al. | |
| 5,515,378 | A | 5/1996 | Roy, III et al. | |
| 5,684,880 | A | 11/1997 | Lazzeroni et al. | |
| 5,862,234 | A | 1/1999 | Todter et al. | |
| 5,937,070 | A | 8/1999 | Todter et al. | |
| 6,201,540 | B1 | 3/2001 | Gallup et al. | |
| 6,202,008 | B1 | 3/2001 | Beckert et al. | |
| 6,278,786 | B1 | 8/2001 | McIntosh | |
| 6,339,758 | B1 | 1/2002 | Kanazawa et al. | |
| 6,654,467 | B1 | 11/2003 | York et al. | |
| 6,912,286 | B1 | 6/2005 | Daly | |
| 6,952,576 | B2 | 10/2005 | Fish et al. | |
| 7,020,288 | B1 | 3/2006 | Ohashi | |
| 7,027,602 | B2 | 4/2006 | Goodman et al. | |
| 7,542,575 | B2 * | 6/2009 | DeLine et al. | 381/86 |
| 2003/0103636 | A1 * | 6/2003 | Arai et al. | 381/302 |
| 2005/0057699 | A1 * | 3/2005 | Bowser | 348/734 |
| 2005/0238183 | A1 * | 10/2005 | Ozawa | 381/94.1 |
| 2006/0239471 | A1 * | 10/2006 | Mao et al. | 381/92 |

FOREIGN PATENT DOCUMENTS

| | | | |
|---|---|---|---|
| JP | 05-344584 | A | 12/1993 |
| JP | 05344584 | A * | 12/1993 |
| JP | 2003-255954 | A | 9/2003 |

* cited by examiner

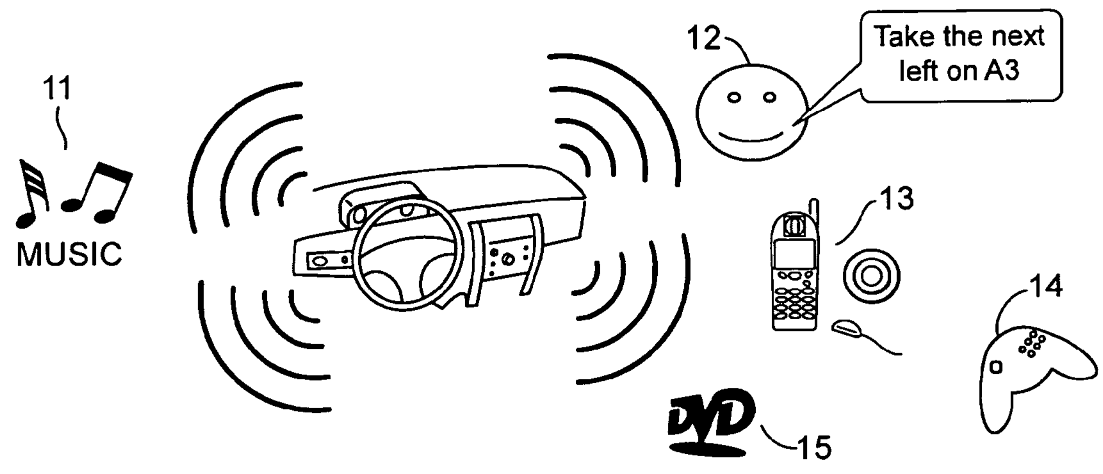
FIG. 1: Multiple in-car audio sources
(PRIOR ART)
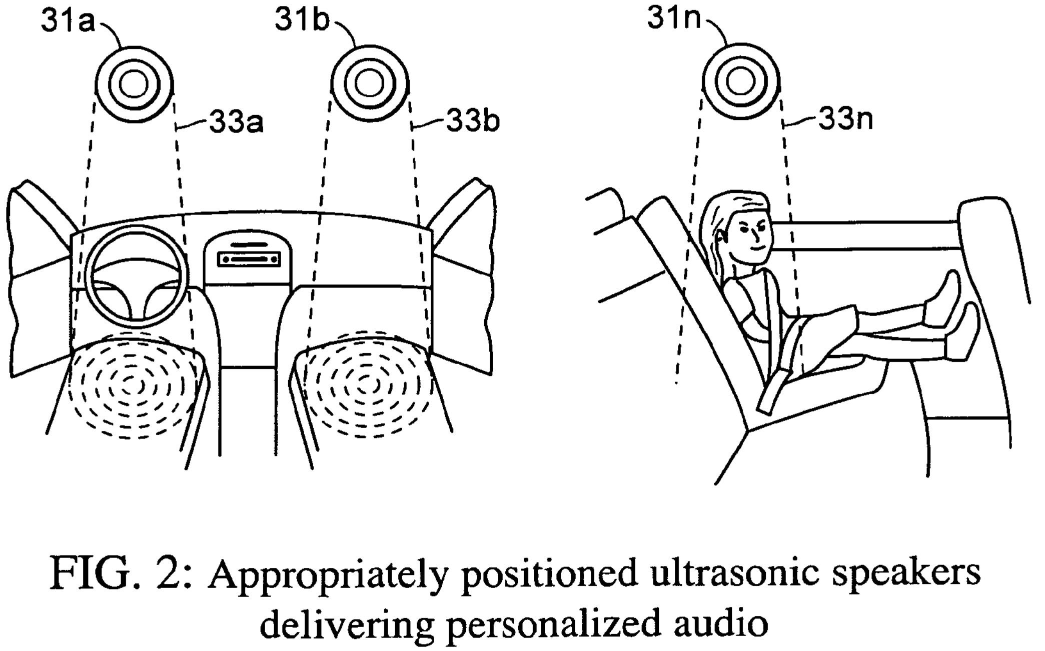
FIG. 2: Appropriately positioned ultrasonic speakers
delivering personalized audio

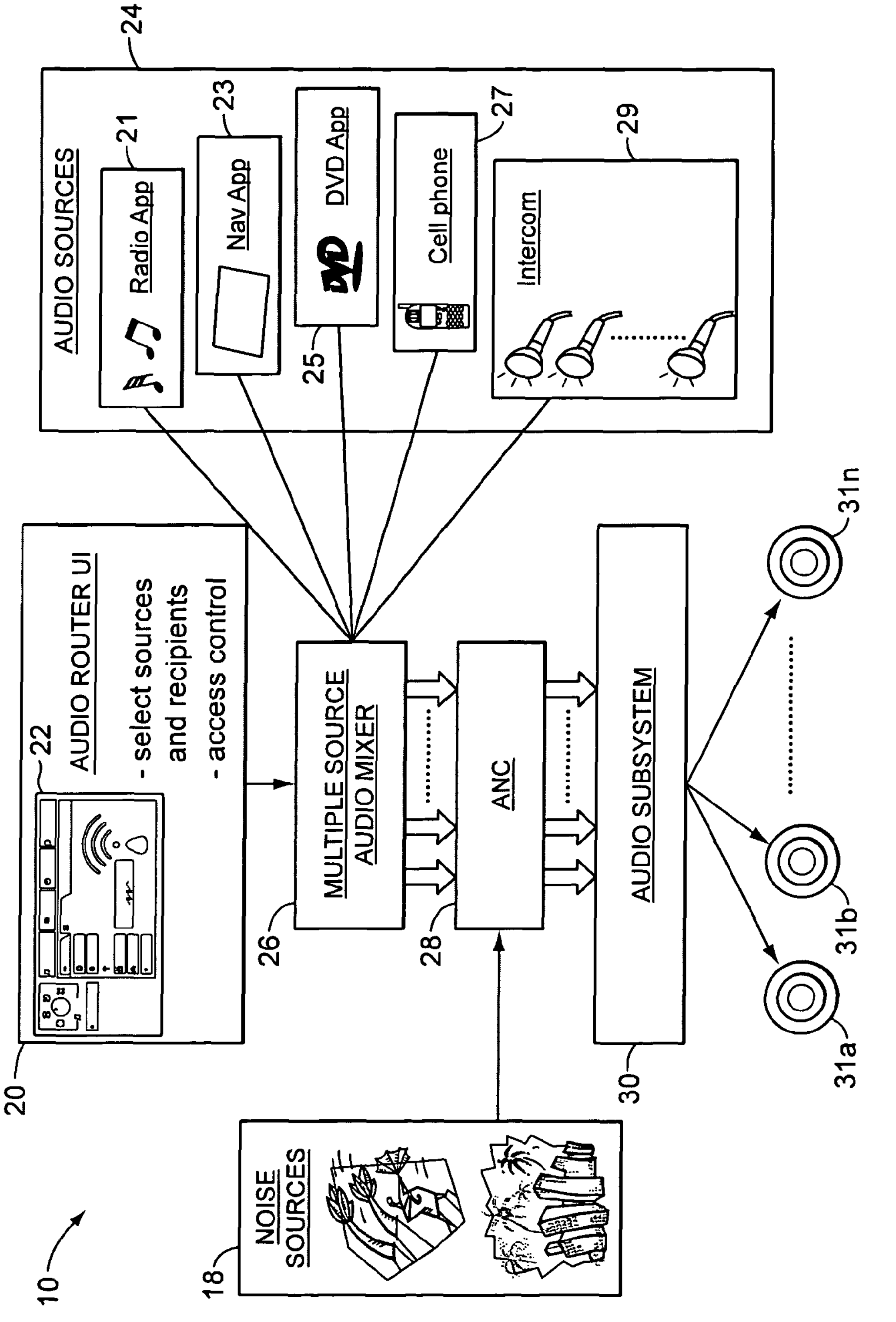
FIG. 3A: High-level system architecture

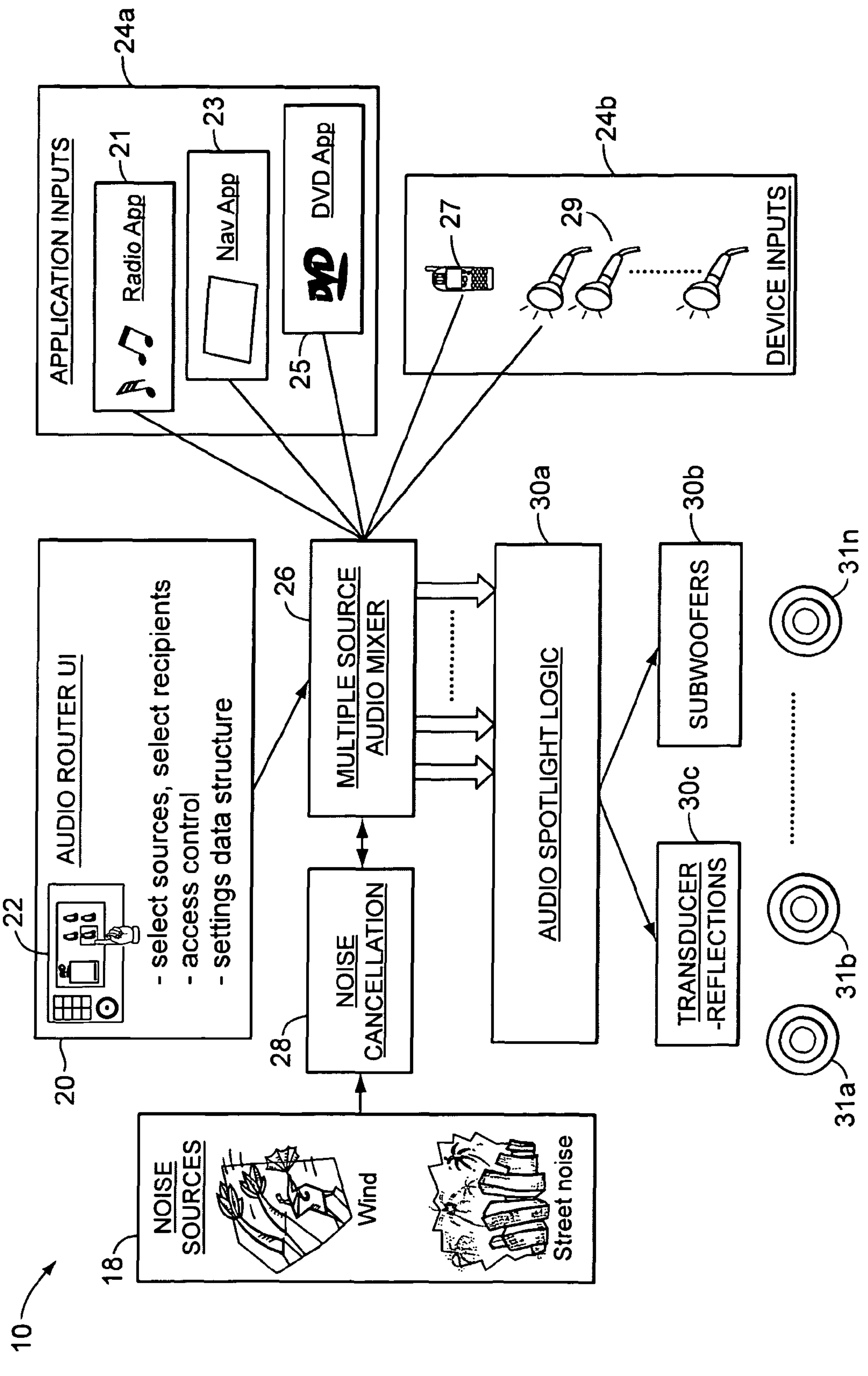
FIG. 3B: System architecture

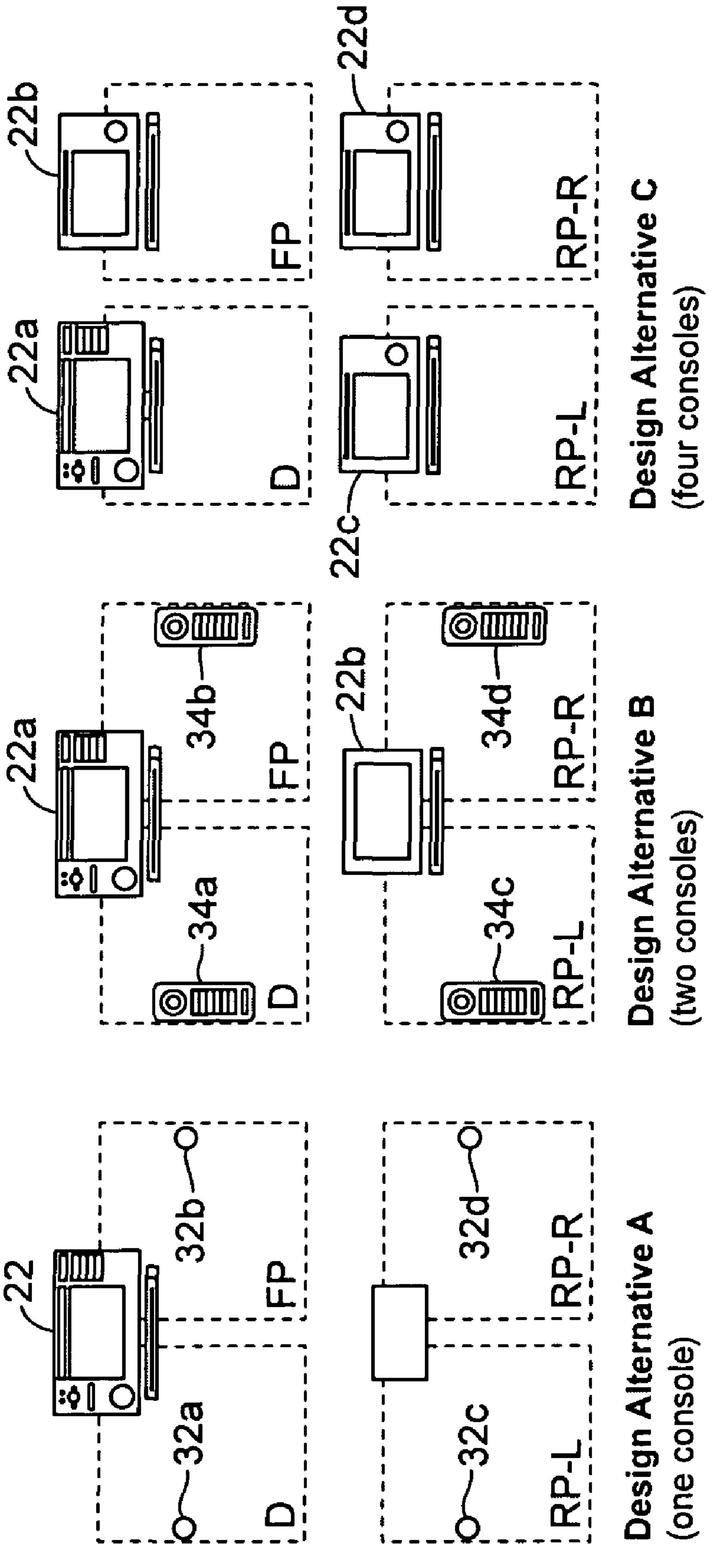
FIG. 4: Exemplary audio router configurations

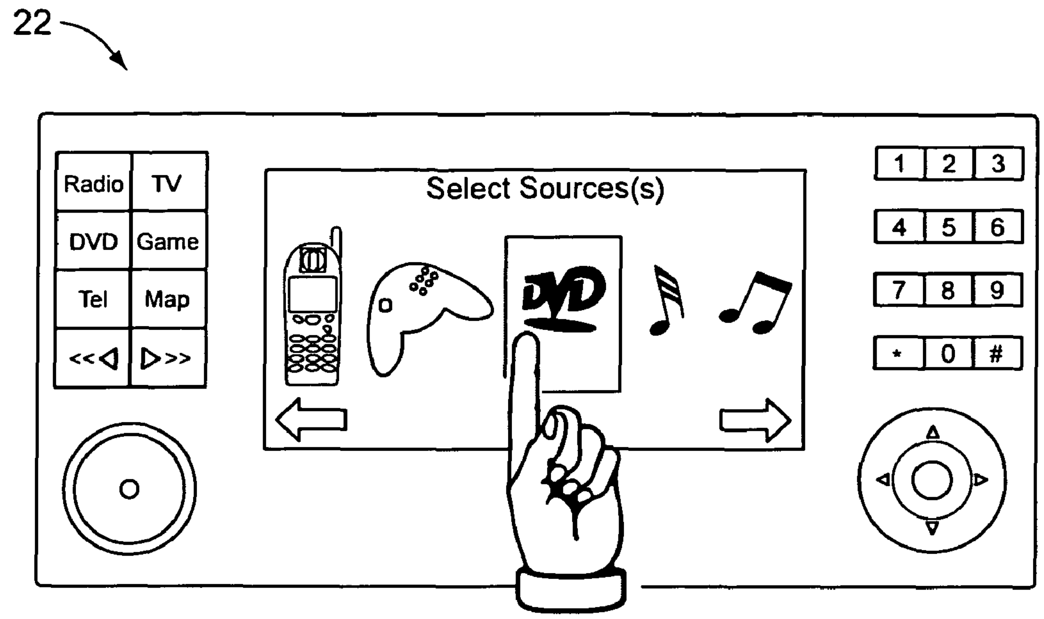
FIG. 5: Selecting an audio source
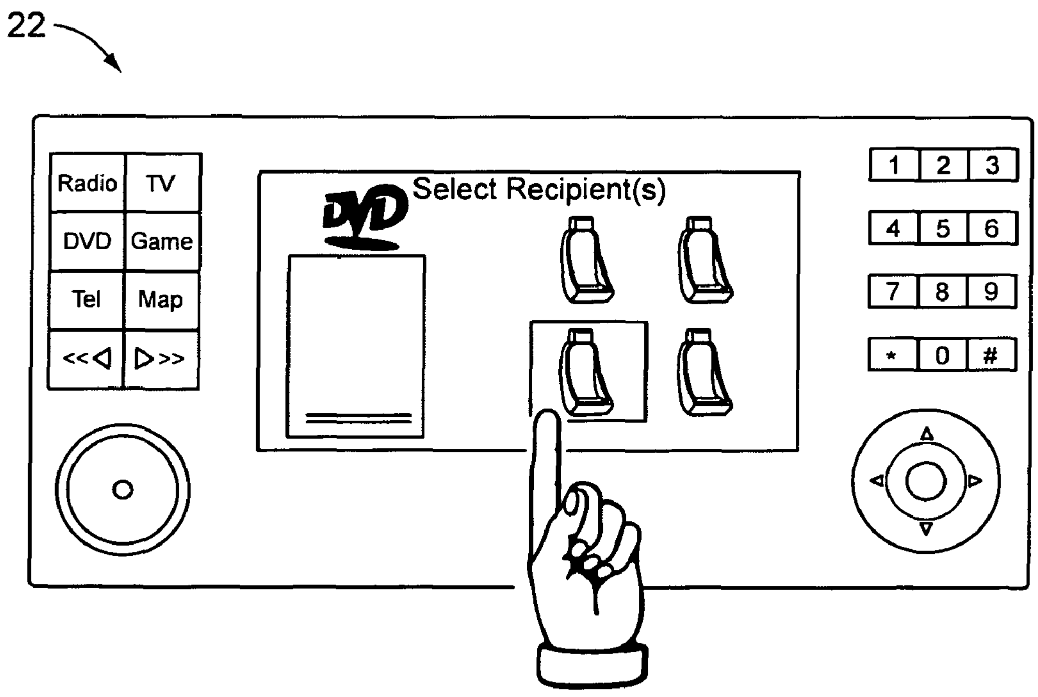
FIG. 6: Selecting the intended recipient(s) of the audio source

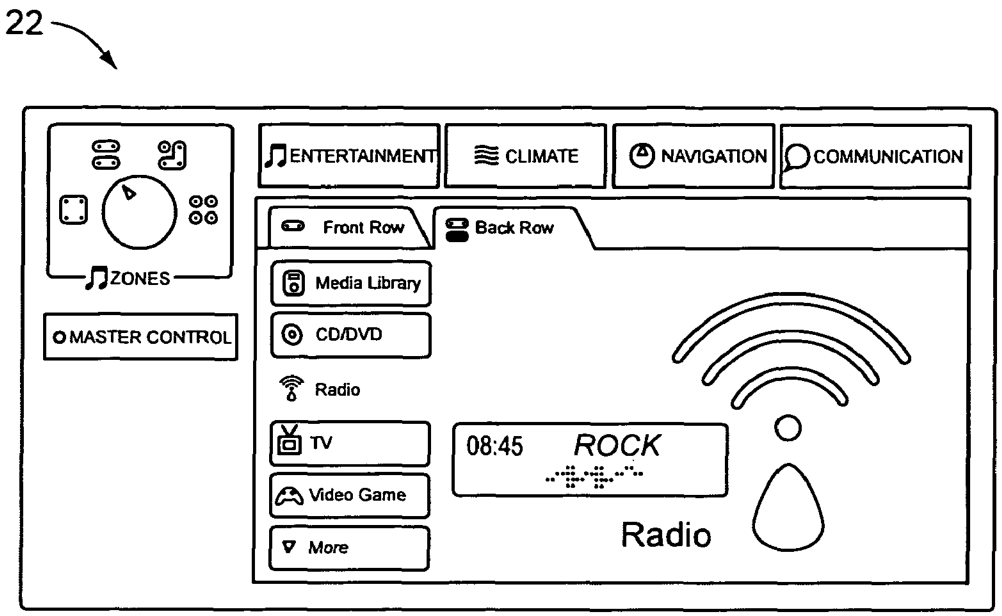
FIG. 7: One embodiment of the front seat audio router user interface
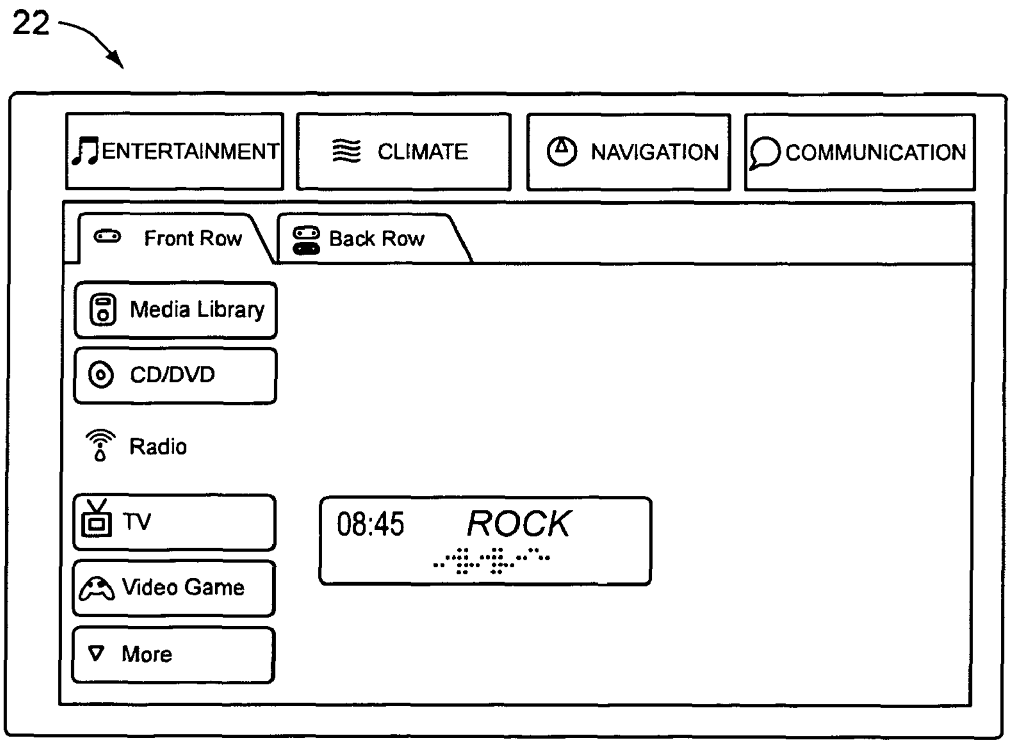
FIG. 8: One embodiment of the rear audio router user interface

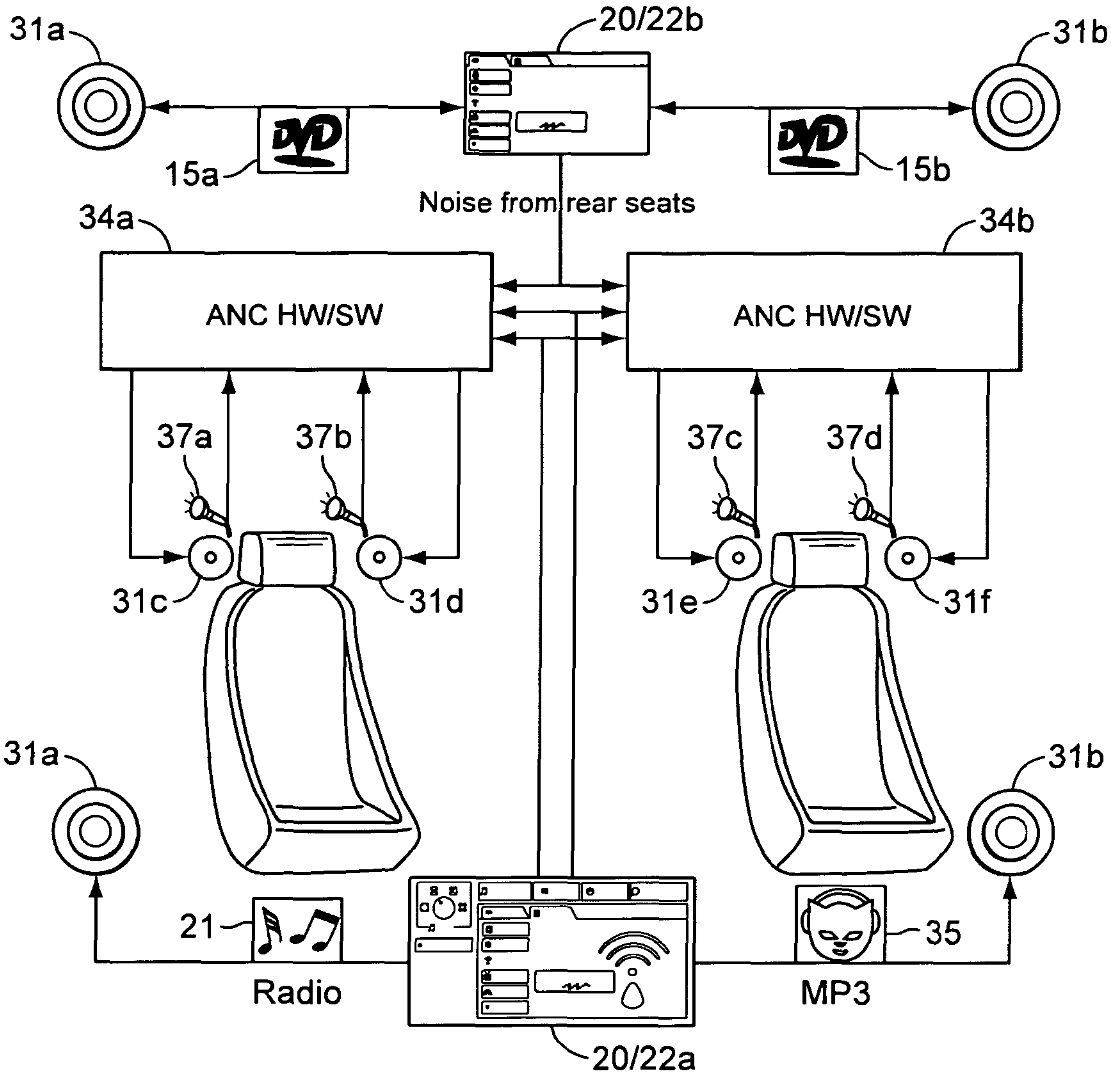
FIG. 9: High-level architecture illustrating the ANC/ANR configuration

SYSTEM AND METHOD FOR CREATING PERSONALIZED SOUND ZONES

CROSS-REFERENCE TO RELATED APPLICATIONS

This application claims the benefit of and incorporates by reference U.S. Provisional Application 60/681,759 filed May 17, 2005 and U.S. Provisional Application 60/712,785 filed Aug. 30, 2005, both entitled "Method And System For Creating Personalized Sound Spaces."

BACKGROUND OF THE INVENTION

In a typical sound system for a particular space, speakers are deployed in various locations throughout that space and one or more audio channels are available for distributing audio from audio sources to the speakers. However, the sounds that emanate from all these speakers may be overheard throughout the space and can be perceived by occupants as undesirable noise. Nevertheless, sound systems are designed to allow convergence of an increasingly large number of audio sources that, together, produce a greater mix of sounds and thus noise pollution within the space. In other words, speakers deployed in a space and divided into groups associated with different zones produce a mix of sounds that create internal noise pollution and, combined with external noise, an unpleasant environment for listeners.

For example, the space associated with a vehicle, a watercraft or an aircraft (whether partially or entirely enclosed) may contain a number of passive and interactive devices and systems that produce audio output for distribution throughout the space via the sound system. These devices and systems may include radios for passive listening, transceivers for two-way communications, navigation aids, computers, mobile devices including cell phones, infotainment systems, game systems, DVD (digital versatile disc) players, television, public address systems with/without a microphone, and the like. Similarly, spaces associated with manufacturing areas, study rooms, command and control centers, hospitals, etc., may also have various passive and interactive devices that produce audio outputs for distribution through the sound system. Hereafter, for simplicity, these system and devices are collectively referred to as "audio sources." Moreover, although audio represents sound in the most generic sense it can also represent any combination of sound and video. Thus, when we refer to "audio" and/or "sound" it does not exclude video and simple data (e.g., television, video games, etc.) which include sounds.

One of these examples reflecting a space associated with a vehicle is shown in FIG. 1. As shown, the sound delivered by the sound system in the vehicle is a combination of the audio outputs from one or more audio sources such as radio 11, navigation system 12, cell phone 13, game system, and DVD player 15. The audio outputs from these audio sources are carried by the sound system to the speakers in one or more channels.

In a single channel sound system the audio outputs from the audio sources are multiplexed and the multiplexed sounds are distributed to the speakers throughout the space. These sounds are widely broadcast at substantially similar levels throughout the space with all occupants being subjected to these sounds, whether they want to be or not. In the vehicle, for instance, the driver and possibly additional occupants may be subjected to objectionable music selected by and played for another occupant. Likewise, the navigation announcements may be heard in the background and they either interfere with the music or simply break the silence. Thus, potentially, the various sounds emanating from the speakers create undesirable noise pollution in the space.

Volume, balance and fader controls are sound control mechanisms deployed and used to alleviate some of the aforementioned effects. With such sound control mechanisms, the music can be muted, say, to allow a cell phone conversation; but, of course, this precludes the other occupant(s) from listening to the music during the phone conversation. Then again, occupants may choose to use earphones or earplugs for additional comfort.

In a multi-channel audio system, each of the channels is associated with a portion of the space. For instance, in a vehicle, the area by the front seats provides access and control over the main audio source and speakers and the area by the rear seats provides access and control over the secondary audio source and speakers. This arrangement provides different sound outputs to different occupants within the space. However, the sounds emanating from the primary speakers (in the area by the front seats) can be heard throughout the space associated with the vehicle and, similarly, the sounds emanating from the secondary speakers (in the area by the rear seats) can be heard throughout the space. Again occupants may resort to headphones or earphones for additional comfort.

The present invention relates to configurations and methods of use of sound systems in a particular space and more specifically to creating personalized sound zones within the particular space.

SUMMARY

According to various embodiments, the present invention contemplates systems and methods for creating personalized sound zones. Among other things, creating personalized sound zones helps reduce the aforementioned noise pollution. For instance, a system for creating personalized sound zones according to principles of the present invention uses noise suppression in audio systems such as entertainment systems, where noise in one sound zone is likely to include audio output of this system to speakers in another sound zone; while traditional noise suppression mechanisms detect and suppress environmental noises such as engine noise, vibration noise or wind noise.

Thus, for the purpose of the present invention as shown and broadly described herein, various embodiments of a system and method are provided. One embodiment of the system for creating personalized sound zones includes: one or more audio sources; speakers each of which are related to one or more sound zones that are associated with a space; a transducer operative to pick up noise; and a noise canceller operative, for each of the sound zones, to produce a noise cancellation/reduction (suppression) value from a correlation between picked up noise and any audio input from the audio sources that are associated with the sound zone and, based on a desired sound level in that sound zone, to apply the noise suppression value for canceling/reducing the picked up noise so as to render the sound zone substantially free of the picked up noise. The correlation can follow a conventional formula to produce a noise coefficient without departing from the principles of the present invention. Each of the one or more sound zones has a predetermined configuration in which they cover the space or any portion thereof.

The system typically includes also an audio router with a control element and one or more channels for routing audio inputs from the audio sources to the one or more sound zones. The control element is either logic or a processor or controller associated with program code. A mixer in the sound system is operative to mix one or more audio inputs routed via the audio router such that each of the one or more sound zones has a virtual mixer for mixing audio outputs associated therewith. In connection with the audio router, the system further includes one or more consoles with display and user interface for selecting audio inputs from among the audio sources and a destination from one or more sound zones. The user interface for selecting audio inputs and destinations includes touch screen, buttons, knobs, keys, soft keys, voice activated input, etc. The consoles include a primary console and any number of secondary consoles. The primary console has further user interface for activating a master control and for selecting among the predetermined sound zone configurations.

An embodiment of the method for creating personalized sound zones is implemented in a sound system. The method includes the step of configuring a space to have one or more sound zones. Then, for a particular sound zone, the method includes the step of picking up noise in that sound zone. The picked up noise includes undesired audio from any audio source in the space (and/or the voice of an occupant in another sound zone). The method further includes leveraging an audio input to the particular sound zone for suppressing the picked up noise in that zone. This leveraging is done by producing a noise suppression value from a correlation between the picked up noise in the particular sound zone and the audio input for that sound zone and, based on a desired sound level of the audio input in that sound zone, by applying the noise suppression value. For a plurality of sound zones, the noise suppression is performed for each zone based on the audio input to such sound zone so as to render that sound zone substantially free of the noise picked up in it.

A system and method for creating sound zones can be implemented in various ways without departing from the scope and spirit of the present invention. The foregoing and other features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

FIG. 1 illustrates audio sources in a vehicle space.

FIG. 2 illustrates one system embodiment with ultrasound speakers for delivering sound to personalized sound zones in a vehicle.

FIGS. 3A and 3B are block diagrams with various degrees of specificity illustrating a sound system for creating personalized sound zones, according to embodiments of the invention.

FIG. 4 provides exemplary configurations of an audio router component of a sound system implemented in accordance with principles of the present invention, according to a specific embodiment.

FIG. 5 is a diagram of a terminal with user interface for selecting an audio source, according to a specific embodiment.

FIG. 6 is a diagram of a terminal with user interface for selecting the recipient of an audio source, according to a specific embodiment.

FIG. 7 is a diagram of an exemplary front seat terminal, say in a vehicle, with audio router user interface, according to a specific embodiment.

FIG. 8 is a diagram of an exemplary rear seat terminal, say in a vehicle, with audio router user interface, according to a specific embodiment.

FIG. 9 is a diagram showing the architecture of an exemplary sound system configured with active noise cancellation/reduction (ANC/ANR) components, according to a specific embodiment.

DETAILED DESCRIPTION OF SPECIFIC EMBODIMENTS

Figure 10:
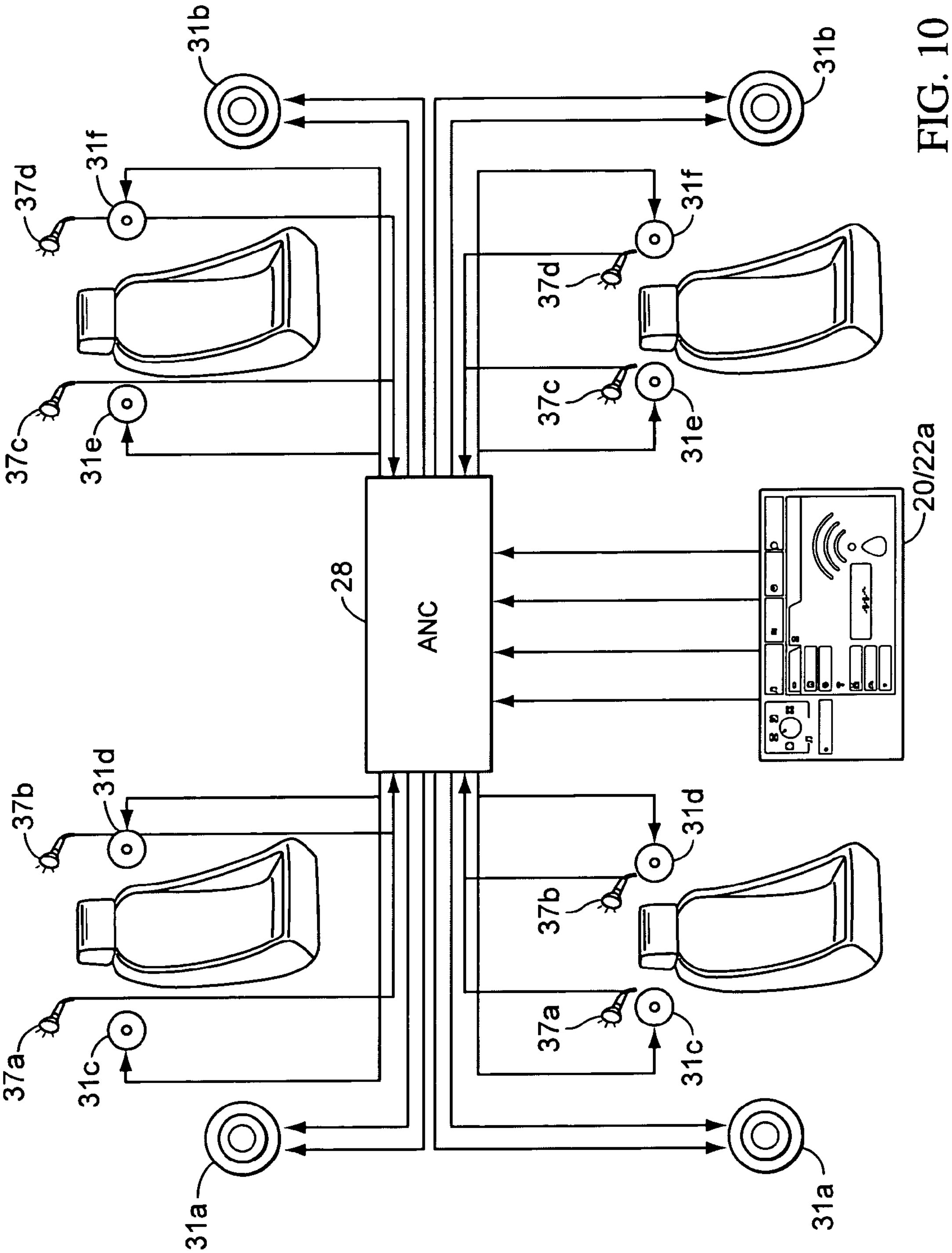
FIG. 10 is a diagram showing the architecture of an exemplary system with an ANC/ANR component operative to suppress noise in each respective sound zone, according to a specific embodiment.

Noise pollution is an undesirable effect that can be addressed with the sound system of the present invention. The preferred way in which this undesired effect is addressed is with sound systems and methods for creating personalized sound zones, according to specific embodiments. With personalized sound zones, occupants of a space can customize their listening area with minimal interference, if any, with or from other co-occupants. The ability to customize sound zones within a space is an effective way to reduce or eliminate the negative effects of noise pollution such that occupants of the space can share it without imposing on each other.

A typical application for creating personalized sound zones according to principles of the present invention involves an audio system, such as an infotainment system, that uses, among other things, noise suppression, where noise in one sound zone is likely to include audio output of this system to speakers in another sound zone; while traditional noise suppression mechanisms detect and suppress environmental noises such as engine noise, vibration noise or wind noise.

For instance, a driver can listen to directions from a navigation system while a back-seat passenger can listen to music and neither one interferes with the other. Likewise, a driver can listen to directions from the navigation system while a passenger can carry a cell phone conversation; and neither one of them is required to turn off their device or remain quiet to avoid interfering with the other. Furthermore, a driver can listen to music at a reasonable volume in the driver's personalized sound zone while passengers have personal quiet sound zones for sleeping in other parts of the space. Indeed, one embodiment of the system can be configured such that each occupant is able to control the power (on/off) and volume of the audio emanating from speakers in their own sound zone to fit their listening preference. Moreover, a driver can use the speaker in the driver's sound zone to carry out a hands-free phone conversation while the passenger sound zones are tailored to screen them from the sounds of the driver's phone conversation. The passengers can either listen to their own audio source, such as a DVD player, or maintain a quite zone. The sound system can be further configured so as to also allow adults to control the devices and contents available to underage occupants. For instance, the system may provide a user interface for customizing sound zones with an override capability for controlling another, underage occupant's sound zone.

According to some embodiments, all or fewer than all of the occupants can participate in a conference call, while those that don't remain undisturbed. The system can be further used for public address or intercom to any selected sound zone in the space to avoid shouting or needlessly disturbing other occupants. This feature may be useful for hearing impaired occupants or for communicating in a multiple row vehicle, such as a sport utility vehicle (SUV) or van. In addition, each of the occupants can take turns acting as a disc jockey (DJ) and controlling the music entertainment for the others, while the driver is free to maintain his focus on driving and navigating.

In other words, as illustrated by the foregoing examples, systems and methods for creating personalized sound zones in a space confer audio freedom on occupants of the space. The so-called audio freedom allows occupants the flexibility to listen to what they want, when and how they want.

To this end, the present invention contemplates various types of sound zones in a space. One such sound zone covers the entire space to allow public address, DJ activity and the like for the benefit of all occupants, if desired. Other examples of sound zones are individual sound zones, one for each occupant, and group or shared sound zones for groups of occupants. Shared sound zones can be used, say, for rear passengers in a vehicle. The various zones are created with placement and control of the speakers in the sound system.

For example, FIG. 2 is a diagram of a system for creating personalized sound zones implemented in this instance with ultrasonic sound delivery equipment—i.e., ultrasonic speakers 31*a-n* and related components. The ultrasonic sound delivery equipment processes the audio inputs using them to modulate an ultrasound carrier. As shown, the ultrasonic amplifiers and speakers create focused directional sound beams. The diameter of the speakers corresponds to the width of the sound beams 33*a-n*. Then, the self-modulating effect of ultrasound waves in air exploits the non-linearity of the air in a predictable manner such that new audible frequencies are generated.

The placement of the ultrasonic speakers can vary to accommodate the configuration of the space. In one instance, the ultrasonic speakers are mounted to the roof of a vehicle above each occupant and concealed beneath the vehicle's headliner. Alternatively, the ultrasonic speakers are mounted in the vehicle's pillars and passenger headrests. Of course, the power and frequency ranges of the ultrasonic speakers are maintained by the sound system at safe levels for the occupants. Other system components, including the controller for monitoring the speakers can be mounted in the trunk or dashboard. Moreover, other types of speaker systems are possible with corresponding desirable effects.

FIGS. 3A and 3B are block diagrams with various degrees of specificity illustrating a sound system for creating personalized sound zones. In the more general illustration of FIG. 3A, a sound system for creating personalized sound zones includes an audio router 20 for routing the audio from the various audio sources 24, one or more consoles or control panels associated with the router (here we show one console 22) for selecting routing paths and other operation parameters, multiple source audio mixer 26, and active noise suppression component (ANC/ANR) 28 for suppressing noise (internal noise or external noise 18), an audio subsystem 30 and multiple speakers 31*a-n*. Conventional non-ultrasonic speakers may be used in most embodiments, besides ultrasonic speakers as discussed above for a specific embodiment.

The sound system control functions control the operation of the sound system including facilitating the routing, mixing, noise cancellation, volume and frequency control. The system has components that perform the system control functions, and these include logic or, more typically, a controller or processor with peripherals and memory for program instructions and data (not shown). In instances where the peripherals and memory are not embedded in a processor chip there is a bus connecting these components. Typically, there is also a system-level bus for connecting between the various aforementioned sound system components.

In the more detailed illustration of FIG. 3B, the sound system is again configured with an audio router 20 and one or more user interface consoles (here we show one 22), multiple sources audio mixer 26, various audio sources 24, active noise canceller (active noise suppression component) 28, various components of an audio subsystem 30 and conventional speakers 31*a-n* (including subwoofers). In this configuration, the audio subsystem 30 includes audio spotlight logic 30*a* and transducer and subwoofer drivers 30*b* and 30*c*. The following describes the sound system components in further detail.

One component of the sound system for personalizing sound zones within a space is the audio router. Within the sound system, the audio router can be implemented in hardware, software or a combination thereof. It is used for system control functions including routing control, selection of audio sources, selection of audio destinations (speakers/sound zones), control of power level and other attributes of routed audio, etc. In one application, the audio router can function as an infotainment device. The audio router 20 includes a user interface 22 for selecting the audio sources and intended recipients (sound destinations) and for setting and controlling data structures. For example, with the audio router user interface, a user can select among audio sources such as radio, cell phone, video game, DVD player, CD player, MP3 player navigation aid, etc. With this user interface, the user can further select not only the destination of audio sources but to control or override access to the audio sources (e.g., adult override to block access to certain channels by an underage occupant).

The degree of control each occupant can exercise over the audio router depends on the particular implementation of the sound system. FIG. 4 is a simple illustration depicting three of the possible implementations. In the first instance, the system is configured with a single console 22 and individual volume controls 32*a-d*. In the second instance, the system is configured with volume control and a pair of consoles 22*a* and 22*b*, each providing shared selection of audio sources. In the vehicle example, this configuration provides a front (main) console to be shared between the driver and the front seat passenger and a rear (secondary) console to be shared by the rear seat passengers. In addition, there are a number of volume and source selection control units 34*a-d* that each occupant can use or share with other occupants if there are more occupants than control units. In the third instance, the sound system operates as a more complete infotainment system with four consoles 22*a-d* for comprehensive control of all system functions (except when overrides or other blocks are implemented and activated). Alternatively, the system can be configured with one console functioning as the main console with substantially complete control and others functioning as secondary consoles with less than complete control over the infotainment system. User interface consoles (or terminals or control panels) can be implemented with user interface capabilities of various kinds, including display with any number of knobs, buttons, keys, soft keys, voice activation, touch screen, or any combination thereof.

FIGS. 5 and 6 provide examples of audio router user interfaces, according to specific embodiments. The diagram in FIG. 5 shows a terminal set up for audio source selection. In this instance selection can be made either by touching the icon on the screen or by pushing a designated button. The occupant can select in this instance audio from one of the audio source devices shown on the screen (cell phone, game, DVD, radio), and to reveal more devices the occupant can scroll left or right.

FIG. 6 shows a terminal set up for selecting recipients once a source is selected, according to a specific embodiment. The recipients can be occupants with personalized sound zones or they can share a sound zone. In the illustrated example, once a DVD is selected as the audio source, it can be routed to the occupant at the left side of the rear seat by selecting that occupant.

FIG. 7 provides another illustration of an exemplary terminal for a front seat occupant, according to a specific embodiment. The illustrated terminal is configured with a touch screen in the center and knobs/buttons around it. This terminal has a master and sound zone configuration control capability in addition to the various audio source and routing selection and control functions.

With all these elaborate control functions at the user's fingertips, such terminal may be used in a sound system configured with an audio router and a single, main terminal as described above. In a vehicle this terminal can be mounted near the driver. This kind configuration might be desirable in a multi-passenger carrier such as bus, ferry, train car or plane.

The "master" control key(s) in a primary terminal provides override control over secondary terminals in a multi-terminal sound system. For instance, in a vehicle with multiple control panels (front and back seat terminals), the primary or main control panel allows a driver or front seat passenger to control the secondary panels. This is useful when the rear seat occupants are too young or otherwise incapable of controlling the secondary terminal, or when adult occupants in the front seat want to monitor activities of underage occupants in the back seat. In other words, an occupant can control a secondary terminal remotely through the primary terminal by switching on the master control key. In one implementation of this feature, when the master control is activated, the display on the secondary terminal or terminals to which this pertains is turned grey or other pale color to show that the secondary terminal cannot be controlled. However, the occupant may be able to see the state of the terminal as it is being remotely controlled. Even then, the occupant with access to the secondary terminal may be able to control the power on/off and volume in their respective sound zone.

In some embodiments, the "master" control key(s) in a primary terminal can provide other override controls. For example, the audio system can include transducers for picking up the speaking voice of occupants, say in neighboring sound zones. This way, the picked up noise would include both audio from audio sources and another occupant's voice. However, unlike undesired audio from the audio sources, the picked up voice may convey desired content, such as warning about the presence of a pedestrian in front of the car, and thus should be heard. So, although technically picked up voice could be suppressed along with the undesired audio, the better approach is to avoid voice suppression or to process it separately because of the special safety criteria that applies to voice. Such criteria may rule out voice suppression for safety reasons, for example if the car is moving the voice suppression feature could be automatically disabled. For instance, the noise suppression to tune out normal chatter may apply safety criteria to differentiate normal chatter from sudden change in tone, speed and/or volume and upon detecting such changes prevent noise suppression. However, when the car is not moving, the user accessing the "master" control may select enablement/disablement of the voice suppression feature enablement or the system may automatically enable the voice suppression feature (with a manual override).

Moreover, while audio noise suppression can be delayed (following activation of an audio source) voice suppression is done in real time. Accordingly, an artificial delay can be advantageously introduced to the audio noise suppression. This is another reason why voice suppression should be processed separately.

The "zones" control provides a selection of pre-determined audio zone configurations (e.g., a single zone covering the entire space, separate front and rear zones, individual occupant zones, and two separate zones one for the driver and one for the remaining occupants). For example, the user may select between having a single zone, separate front and rear zones, individual occupant zones, a driver zone and remaining zone, or a combination therof. The system, according to a specific embodiment, can provide flexibility so that such audio zone configurations also may be determined and set/reset by the user. The predetermined sound zones define how the space as a whole may be divided and, if so, what parts of the space will become the destination for selected audio sources. In turn, sound zones will indicate to which occupants a selected audio source will be routed and by which occupant the audio can be volume-controlled or muted. Different spaces may require more, fewer or different types of audio zone configurations. For instance, multi-passenger carriers, gathering halls, hospitals and study areas define spaces that will require different zone configurations and perhaps many more than the four zones of a passenger vehicle.

For systems with primary and secondary terminals, FIG. 8 provides an illustration of a terminal that can function as a secondary terminal, say, for a rear-seat occupant. The secondary terminal shares the many functions of the primary terminal. In this instance, the illustrated terminal has the various audio sources and routing selection and control capabilities but it does not have the master and sound zone configuration selection capabilities of the primary terminal. Nevertheless, such terminals provide to occupants the freedom to tailor their personalized sound zone as they wish. The rationale behind reserving the master and zone configuration controls to the primary terminal, according to some specific embodiments, is to avoid unexpected or undesired remote control of the primary terminal from the secondary terminal. There is a good reason, for instance, to prevent startling a driver by eliminating the possibility of remotely controlling the driver's terminal from a secondary terminal in the back.

Also, preferably, some degree of access prevention or control will be available so as to prevent unauthorized routing to a sound zone. In this case, the system will intervene to prevent an unauthorized occupant from using a secondary control panel to select and route unwanted music to another occupant. Accordingly, for managing the audio inputs, the sound system may have one central control panel on which the audio router interface is available or, alternatively, the sound system may have multiple control panels for the individual or groups of occupants, but with some degree of access control.

The above-described audio router can be configured to route more than one audio input, from more than one audio source, to each personalized sound zone. Accordingly, returning to FIGS. 3A and 3B, the audio router 20 interfaces in the sound system with a multiple sources audio mixer 26. The multiple sources audio mixer receives from the audio router one or more audio inputs originating from various audio sources and mixes them in real time (this is not to be confused with the artificial delay that can be advantageously introduced to optimize the noise suppression). With the multiple sources audio mixer, each occupant will have their own virtual mixer for mixing their selected multiple audio inputs. Thus, for example, the driver may want to simultaneously listen to music while the navigation system is actively guiding him along the way. In another example, the audio mixer combines (mixes) audio inputs from audio sources such as from a radio, DVD player and possibly also a cell phone.

Another effect that the sound system addresses is noise, external and internal noise. The noise suppression component 28 provides active noise cancellation in the targeted sound zone based on the known level of sound that is desired in that zone. In a sound zone where the desired sound level is relatively low, the corresponding noise cancellation will be more substantial to eliminate more noise.

More specifically, the sound system employs noise cancellation techniques to improve the quality of sound reception in the sound zones based on the desired level of sound. The noise cancellation aspect of the sound system accomplishes this by leveraging knowledge about the particular sound zones and the noise they are subjected to. For example, the noise canceller uses knowledge of the interior configuration of a vehicle, its occupants, available audio sources and noise to figure out the degree and manner of noise cancellation.

Indeed, for each sound zone, the audio router knows the level and kind of audio streams to the zone and it can feed this information to the noise canceller. With this information, the active noise suppression (cancellation/reduction (ANC/ANR)) components can deploy ANC/ANR techniques that suppress the noise effects of one sound zone on its neighboring sound zones. This noise cancellation is useful for example when in one sound zone an occupant lowers the volume and yet in another sound zone the occupant raises the volume creating noise pollution.

The noise suppression (ANC/ANR) feature is typically activated when the audio streams to the neighboring sound zones are different. When the sound zones receive similar audio streams the noise cancellation is not needed, unless sounds from other audio sources are present. Therefore, the system is designed so that when the same audio streams are fed to neighboring personalized sound zones the ANC/ANR is not used to deal with the sounds of such neighboring zones. At the same time, the ANC/ANR is activated to deal with noise emanating from neighboring sound zones if they receive different audio streams or if besides the shared audio streams they receive different audio streams that are not shared. Hypothetically, if one occupant carries out a hands-free phone conversation the ANC/ANR feature will eliminate/reduce the sounds of this conversation from the sounds in another occupant's sound zone. This can be accomplished by using a microphone or transducer to pick up the speaking voice of the occupant that carries out the telephone conversation and feeding the picked-up voice to the ANC/ANR components for cancellation/reduction before delivering the desired sounds to the sound zone. In other words, knowledge of noise created anywhere in the space can be leveraged to cancel/reduce noise pollution that might otherwise interfere with various personalized zones. This way, one occupant does not interfere with the other when the noise canceller is active.

Moreover, the ANC/ANR handles noise from external sources such as wind noise. To this end, microphones or other transducers pick up the external noise, which is undesired, and feed it to the ANC/ANR components for processing (i.e., cancellation/reduction). In this instance the ANC/ANR feature will be active to cancel/reduce external noise even if all the sound zones receive the same audio inputs from the audio router.

FIG. 9 is a diagram showing the architecture of an exemplary sound system configured with ANC/ANR components. In this example, the sound system has two consoles, a primary console 20/22*a* for the front seat area and a secondary console 20/22*b* for the rear seat area. Each seating area is equipped with speakers 31*a-f* that can be grouped or divided based on the selected sound zone configuration. As shown, in this example occupants in the back seat receive audio from DVDs 15*a-b* and the occupants in the front seat receive audio from a radio 21 on the left and MP3 device 35 on the right. However, the sounds emanating from the speakers might be overheard in other zones, which is why the noise cancellation is needed.

To this end, small microphones or transducers 37*a-d* in the vicinity of the ear or ears of the occupants pick up whatever audio is present in that vicinity. The picked up audio (noise), combined with the audio (reference) streams, are routed to the ANC/ANR components 34*a*, 34*b* for processing. Then, the ANC/ANR algorithm is designed to cross correlate the clean reference signals and the (noise) signals recorded in the vicinity of the occupants' ears. The ANC/ANR algorithm derives from the cross correlation the noise-cancellation value for suppressing the noise in the vicinity of the occupants' ears. The respective noise cancellation (suppression) values are routed to the small speakers in the particular sound zones. Note that the calculations can be done using common correlation formulas to produce a noise coefficient (noise cancellation value) and to apply it accordingly. Note further that any 'play' delay between the activation of an audio source and the actual playing of the sound in a sound zone is beneficially exploited in order to suppress the noise. Even if there are a number of iterations, this along with the substantially real time calculations add up to a small delay, smaller than the play delay, an thus noise suppression can be optimized even before the noise effects the neighboring sound zone. In other words, an artificial delay after activation of an audio source can be introduced in order to allow optimized noise suppression. This delay is easily tolerated and is hardly perceived by the listener, if at all. By comparison, voice suppression would be done in real time.

The net effect of this approach is that a volume is created around the ear or ears of each occupant in which the desired audio is heard and the unwanted audio (noise) is excluded. With installation of ANC/ANR components associated with the rear seat area, a similar process would be possible for noise emanating from the front seat area and overheard in the rear seat area.

Although FIG. 9 shows a more than one ANC/ANR component, in reality the noise suppression for individual sound zones can be handled with one ANC/ANR component. Such ANC/ANR component may be logically divided to handle each zone separately or it may be otherwise operative to handle each zone at a time. FIG. 10 is provided to show this example and, in this instance, the sound system has a single, primary console and four or more sound zones.

In larger spaces, the physical distance between occupants may be helpful for reducing noise pollution but it may hinder conversation between distant occupants. Accordingly, the sound system can be configured to help occupants carry a conversation even in such large spaces. In one embodiment, the system can be configured with one or more small microphones or transducers placed in proper locations within the large space for picking up voices of the occupants in the various sound zones. By deploying the microphone or microphone array in a large space, along with the audio router for selecting recipients, clear conversations can be conducted between select occupants. Based on the zone configuration as mentioned above, the conversation mode can be one-to-one, one-to-many, etc.

Yet another characteristic of a sound system for creating personalized sound zones is its ability to create an area with a high degree of privacy akin to a private telephone booth. In one embodiment, this is achieved with ultrasonic sound delivery equipment and noise cancellation. Indeed, the sound system can create quite zones even in open spaces. The quiet zones can be used to inform or entertain occupants without disturbing other occupants, say, in an entrance lobby or waiting area of a conference hall. The sound system can be further used to create private meeting spaces or conference call areas without the need for closed doors. The sound system can be additionally used to create quite zones around hospital beds so that one patient watching television doesn't interfere with the quite rest of a nearby patient. In other words, although the sound system was illustrated in the context of a space associated with a vehicle the invention contemplates use of sound systems with the aforementioned or like features in other spaces, examples of which were mentioned above.

In sum, sound systems designed based on principles of the present invention are operative to also cancel audio/entertainment noise. Unlike the conventional real-time noise suppression of environmental noise, audio suppression according to the present invention beneficially employ the typical time delay after, e.g., 'play' button activation for optimizing noise suppression (the time after activating a potentially undesired audio source in one zone is used for optimized noise suppression calculations to find the noise coefficient and apply it in another zone). Moreover, although the present invention has been described in considerable detail with reference to certain preferred versions thereof, other versions are possible. Therefore, the spirit and scope of the appended claims should not be limited to the description of the preferred versions contained herein.

What is claimed is:

1. A sound system for creating personalized sound zones, comprising:

one or more audio sources;

speakers each of which is related to one or more sound zones that are associated with a space;

a transducer operative to pick up noise in a particular sound zone, the picked up noise including undesired audio from any of the audio sources and/or the voice of an occupant in another sound zone;

a noise suppressor operative to produce a noise suppression value from a correlation between any noise picked up in the particular sound zone and audio input from the audio sources for that sound zone and, based on a desired sound level of the audio input in that sound zone, to apply the noise suppression value for suppressing the picked up noise and rendering that sound zone substantially free of the picked up noise, wherein the noise suppressor is operative to selectively recognize voice sounds external to that sound zone and prevent the noise suppression value from including the voice sounds such that a voice from outside that sound zone is audible within the sound zone while other noise is suppressed; and an audio router with a control element and one or more channels for routing audio inputs from the audio sources to the one or more sound zones; and one or more consoles with display and user interface for selecting audio inputs from among the audio sources and a destination from one or more sound zones, said user interface including a zones control that enables a selection of pre-determined sound zone configurations designating the particular sound zones that will become the destination for the audio sources selected for the particular sound zones.

2. The sound system as in claim 1, wherein the control element is either logic or a processor or controller associated with program code.

3. The sound system as in claim 1, further comprising a mixer operative to mix one or more audio inputs routed via the audio outer such that each of the one or more sound zones has a virtual mixer for mixing audio inputs associated therewith.

4. The sound system as in claim 1, wherein each of the one or more sound zones has a predetermined configuration in which they cover the space or any portion thereof.

5. The sound system as in claim 4, wherein the one or more consoles include a primary console and any number of secondary consoles, the primary console having further user interface for activating a master control and for selecting among the predetermined sound zone configurations.

6. The sound system as in claim 1, wherein each of the sound zones has a transducer that is placed within a predetermined distance from an occupants' ear and/or mouth.

7. The sound system as in claim 1, wherein the transducer is a microphone.

8. The sound system as in claim 1, wherein the noise suppression component uses a delay after audio source activation to optimize suppression of the picked up noise.

9. A sound system for creating personalized sound zones, comprising:

one or more audio sources producing audio inputs;

speakers each of which being related to one or more sound zones that are associated with a space;

a mixer operative to mix one or more audio inputs such that each of the one or more sound zones has a virtual mixer for mixing audio inputs associated therewith;

a transducer operative to pick up noise in a particular sound zone;

a noise suppressor operative to leverage audio inputs to the particular sound zone for suppressing the picked up noise and rendering that sound zone substantially free of the picked up noise, wherein the noise suppressor is operative to selectively suppress the picked up noise such that select picked up noise from outside the particular sound zone can be heard within the sound zone while other of the picked up noise cannot be heard within the particular sound zone; and an audio router with a control element and one or more channels for routing audio inputs from the audio sources to the one or more sound zones; and one or more consoles with display and user interface for selecting audio inputs form among the audio sources and a destination from one or more sound zones, said user interface including a zones control that enables a selection of pre-determined sound zone configurations designating the particular sound zones that will become the destination for the audio sources selected for the particular sound zones.

10. The sound system as in claim 9, wherein the picked up noise includes undesired audio from any of the audio sources and/or the voice of an occupant in another sound zone.

11. The sound system as recited in claim 9, wherein said selection of predetermined sound zone configurations is determined and set by the user of one of the consoles, and wherein said mixer is responsive to said selection of pre-determined sound zone configurations to direct audio inputs to sound zones according to the pre-determined sound zone configuration selected.

12. The sound system as recited in claim 11, wherein said user interface provides a variety of pre-determined sound zone configurations the user may select amongst, wherein said pre-determined sound zone configurations comprise at least one of a single zone covering the entire space, separate front and rear zones, a driver zone and a remaining zone, a plurality of individual zones, and a combination of individual zones.

13. The sound system as recited in claim 9 wherein the noise suppressor is operative to selectively recognize voices external to that sound zone and prevent the noise suppression value from including the voice such that a voice from outside that sound zone is audible within the sound zone while other noise is suppressed.

14. A method in a sound system for creating personalized sound zones, comprising:

configuring a space to have one or more sound zones;

selecting a desired audio signal for the one or more sound zones on one or more consoles having a display, wherein at least one of the one or more consoles includes a display having a graphical representation of at least two different predefined sound zones;

picking up noise in a particular sound zone, the picked up noise including undesired audio from any audio source in the space and/or the voice of an occupant in another sound zone;

leveraging an audio input to the particular sound zone for suppressing the picked up noise in that zone, including by:

producing a correlation coefficient from a correlation between the picked up noise in the particular sound zone and the audio input for that sound zone, and applying the correlation coefficient based on a desired sound level of the audio input in that sound zone.

15. The method as in claim 14, wherein, for a plurality of sound zones, the noise suppression is performed for each zone based on the audio input to such sound zone so as to render that sound zone substantially free of the noise picked up in it.

16. The method as in claim 14, wherein the noise is picked up with a microphone in the particular zone.

17. The method as in claim 14, wherein the noise emanates from speakers in the space.

18. The method as recited in claim 14, including recognizing a voice from outside the one or more sound zones and omitting the voice from the correlation coefficient such that the voice from outside the one or more sound zones can be heard within the sound zone, while other undesired noise is cancelled.

* * * * *